Patented Mar. 27, 1928.

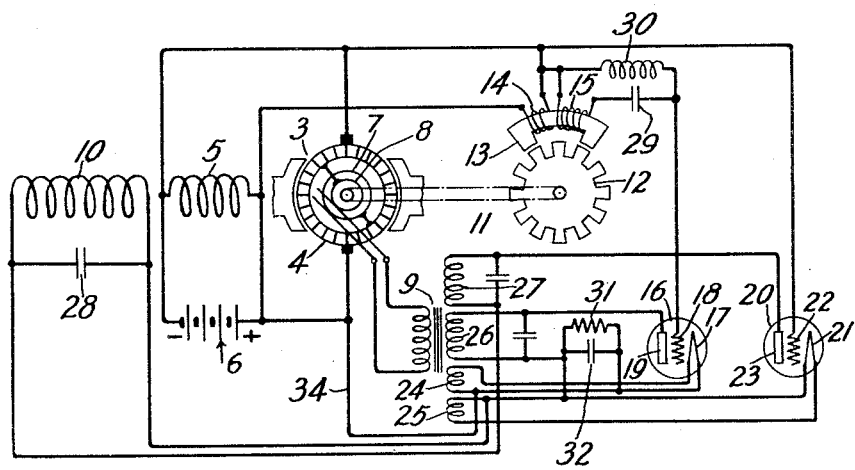

1,663,891

UNITED STATES PATENT OFFICE.

HUGH M. STOLLER, OF MOUNTAIN LAKES, NEW JERSEY, AND EDMUND R. MORTON, OF NEW YORK, N. Y., ASSIGNORS TO WESTERN ELECTRIC COMPANY, INCORPORATED, OF NEW YORK, N. Y., A CORPORATION OF NEW YORK.

REGULATOR SYSTEM EMPLOYING ELECTRON-DISCHARGE DEVICES.

Application filed July 24, 1926, Serial No. 124,599. Renewed June 11, 1927.

This invention relates to electrical regulators and particularly to systems for regulating the speed or frequency of dynamo electric machines, and is an improvement in the regulator claimed in the application of H. M. Stoller, Serial No. 750,857, filed November 19, 1924.

An object of the invention is to improve the operation and compactness of such a system.

Another object of the invention is to provide for use with a direct current motor, a sensitive regulator which requires no external sources of potential, and which operates with a minimum of maintenance.

In systems for regulating the frequency, or other characteristics which may be represented by an electrical variation of frequency proportional to the characteristic to be regulated, it has been found desirable to employ a frequency selective circuit, such as a tuned circuit, for controlling the amplitude of the current impressed upon the regulator. With such arrangements, it is desirable that the controlling frequency be relatively high so that impedance elements having high time constants may be economically built in order to obtain sensitive regulation.

It is also desirable that the regulating systems be kept as compact as possible. Thus, in systems employing electron discharge devices, it is desirable to use as few sources of potential as possible for energizing the devices. This can be most readily done by employing alternating current, which may be transformed to give the different voltages required, for supplying cathode heating current and space current. For this purpose an alternating current of low frequency is most satisfactory, since low frequency currents can be more readily and economically transformed.

In accordance with one feature of this invention the frequency of an electric circuit is controlled through an electron discharge device, an alternating current derived directly from the circuit being applied to one electrode of the device, and an alternating current having a frequency, which is higher than the frequency directly derived from the circuit, being applied to the other electrode through a frequency selective circuit. The space current of the device is employed for controlling the circuit.

In a preferred form, this invention comprises a vacuum tube regulator for a direct current motor, the motor being furnished with slip rings for supplying an alternating current for heating the cathode and for supplying space current to the tube. A high frequency generator is connected directly to the motor for supplying alternating current through a tuned circuit to the grid of the tube. The speed of the motor is controlled, in response to variations in the frequency of the generator, through a field winding of the motor connected in the space current circuit of the tube.

This invention can be more readily understood by reference to the following detailed description in connection with the drawing which shows diagrammatically one embodiment thereof.

The drawing shows a direct current motor 3 having a commutator 4 and a shunt field winding 5 supplied with direct current from a source 6. The motor is also provided with slip rings 7 and 8 connected to commutator bars 180° apart. These slip rings are provided with brushes connected to a transformer 9 for supplying alternating current to the regulator circuit during the operation of the motor. The motor is also provided with a regulator field winding 10 which is so wound as to supply flux which aids that supplied by the winding 5. Directly connected to the motor 4 (or mounted in the same frame) is a high frequency inductor generator 11, comprising a toothed rotor 12 and a field structure 13 on which is mounted a field coil 14 connected to the source 6 and a generator coil 15. As the teeth of the rotor pass the pole pieces of the field structure, the reluctance of the magnetic circuit is varied generating electrical variations of high frequency in the winding 15.

The regulator circuit proper comprises a detector tube 16, having a cathode 17, a grid 18 and a plate 19, and an amplifier tube 20, having a cathode 21, a grid 22 and a plate 23. Heating current is supplied to the cathodes 17 and 21 respectively from the secondary windings 24 and 25 of the transformer 9. Space current is supplied to the tubes 16 and 20, respectively, from the secondary windings 26 and 27, each of which is shunted by a condenser. The source 6 is employed for negatively biasing the grids of both tubes as explained below. A tuned circuit comprising a condenser 29 and an inductance 30 is connected to the winding 15 of the generator 11. The inductance coil 30 is connected in the grid circuit of the detector tube 16 in series with the source 6. The circuit may be traced from the grid 18, inductance 30, negative terminal of source 6, positive terminal of source 6, conductor 34 to cathode 17. A resistance 31 shunted by condenser 32 is connected in the plate circuit of the tube 16. Condenser 32 is given such a value that the voltage across the terminals of the resistance 31 is proportional to the value of the high frequency potential impressed on the grid 18 and practically independent of the low frequency plate current source. Resistance 31 is connected in series with the source 6 between the grid and the cathode of the tube 20. The circuit may be traced from grid 22, negative terminal of source 6, positive terminal of source 6, conductor 34, resistance 31 to cathode 21. The regulator winding 10 is connected in series with the secondary winding 27 in the plate circuit of the tube 20. The condenser 28 is connected in shunt to the winding 10 to stabilize the intermittent current supplied by the tube 20.

The operation of the circuit is as follows: When the motor 4 is started it will accelerate until the frequency of the current developed by the generator 11 approaches the frequency to which the inductance 30 and condenser 29 are tuned. As the speed increases the potential of the grid 18, which is normally negative due to the bias of the source 6, is increased by the alternating voltage drop across inductance coil 30. This superposed potential causes space current to flow in the detector tube producing an IR drop in the coupling resistance 31. This potential, due to the IR drop is impressed upon the normally negative grid 22 of the amplifier 20, causing space current to flow in the amplifier tube and consequently in the regulator field 10. This current increases the excitation of the motor and prevents any further rise in speed.

The constants of the motor and regulator circuit are so adjusted that the operation of the motor is in equilibrium at a point on the ascending portion of the resonance curve of the circuit 29 and 30. When the speed of the motor varies from this point, the current through the regulator field 10 is varied to correct the tendency of the motor speed to change. For example, if, due to a change in load or voltage, the speed of the motor decreases slightly and accordingly the frequency of the current in the winding 15 of the generator 11, the alternating component of the potential of the grid 18 of the detector tube is decreased causing a corresponding decrease in the IR drop in the resistance 31, and a consequent decrease in the variable component of the potential of the grid 22 of the amplifier tube producing a resulting decrease in the current through the regulator field 10 which limits the tendency of the motor to further decrease in speed, as would occur in normal unregulated operation.

Since the frequency of the variations impressed upon the grid of the detector tube 16 is greater than the frequency of the variations impressed on the plate there will be variations of potential of both signs impressed upon the grid during the intervals when the plate is positive. In order to prevent a balance of effects due to the positive and negative potential alternations of the grid, the tube must be caused to function as a detector, that is, it must operate on the curved portion of its characteristic.

The embodiment described may be variously modified without departing from the spirit of the invention. For example, in some instances it may be found that the space current of the detector tube is sufficient for controlling the motor through the regulator field and the amplifier tube therefore may be omitted.

What is claimed is:

1. A system for regulating a characteristic of an electrical circuit, comprising means for deriving electrical variations the frequency of which is proportional to said characteristic, means for deriving other electrical variations the frequency of which is different from the frequency of said first variations, an electrical discharge device having a cathode, an anode and a control electrode, means for impressing one of said variations on said control electrode, means for impressing the other of said variations on said anode, and means for controlling said characteristic in response to changes in the anode current of said device.

2. A system for regulating a characteristic of a dynamo-electric machine comprising means for deriving electrical variations the frequency of which is proportional to said characteristic, an electrical discharge detector having a cathode, an anode and a control electrode, means including a frequency selective circuit for impressing a potential proportional to the frequency of said variations on said control electrode, means for impressing variations on said anode having a frequency less than said first mentioned variations, and means for controlling said characteristic in response to changes in the anode current of said device.

3. A system for regulating the speed of a dynamo electric machine, comprising a regulator field winding for said machine, an electrical discharge device comprising an anode, a cathode and a control electrode, means for impressing electrical variations on the anode and cathode of said device, connections from
the anode circuit of said device to said regulator field winding, means for deriving electrical variations proportional to the speed of
the machine and having a higher frequency
than the frequency of said first variations,
means including a highly selective transmission path for impressing on said control electrode a potential proportional to the frequency of said last mentioned variations
whereby the rectified variations flowing in
the anode-cathode circuit of the device are responsive to variations in the frequency of said
last mentioned variations, the speed of the
machine and the characteristics of said path
being adjusted so that the operation of said
system is stable at a point on the characteristic curve of said selective circuit at which
the potential impressed upon the grid of the
device is directly proportional to the frequency of said last variations.

4. A speed regulating system for an electrical motor supplied with a current from a
direct current source, comprising a regulator
field winding for said motor, means for deriving from said motor electrical variations,
an electric discharge detector comprising an
anode, a cathode and a control electrode,
means for impressing said electrical variations on the anode and cathode of said detector for supplying space current thereto,
means for connecting said regulator field
winding in circuit with said anode and cathode, means for driving electrical variations
the frequency of which is proportional to the
speed of the machine and having a frequency
higher than said first mentioned variations, a
tuned circuit connected to said last mentioned
means, connections from the terminals of
one element of said tuned circuit to said cathode and control electrode, said connections
including the source of current for said motor for negatively biasing the control electrode, the characteristics of said machine and
said tuned circuit being so adjusted that the
operation of the system is stable when the
frequency of said last mentioned variations
is on the ascending portion of the resonance
curve of said tuned circuit whereby the rectified variations flowing in the anode-cathode
circuit of the detector and through the regulator field winding are responsive to variations in the frequency of said last mentioned
electrical variations for maintaining the
speed of the motor substantially constant.

5. In a system for regulating a characteristic of a dynamo-electric machine having a
regulating field winding, means for generating control alternating current the frequency
of which varies according to said characteristic of the dynamo-electric machine, a three
element space discharge tube for controlling
the energization of said regulating field
winding to govern said characteristic of the
dynamo-electric machine, means for supplying alternating space current to said tube,
said alternating space current having a frequency lower than the frequency of the control alternating current, and means for impressing a potential on the grid of said tube
which varies according to the frequency of
said control alternating current to vary the
space current flow through said tube.

6. In a regulator system for a motor having a regulating field winding, a pilot generator supplying current the frequency of
which varies according to the speed of said
motor, a three element space discharge tube
for controlling the energization of said regulating field winding to govern the motor
speed, means for supplying an alternating
space current to said tube, said last mentioned alternating current having a frequency less than the frequency of current
from the pilot generator, and means for impressing a potential on the grid of said tube
which varies in amplitude according to the
frequency of the current supplied by said
generator to vary the space current flow
through the tube.

7. In a regulator system for a motor having a regulating field winding, a pilot generator supplying current the frequency of
which varies according to the motor speed, a
resonant circuit tuned to a frequency slightly
different from the frequency of the generator
when the motor is operating at normal speed,
said generator having only one armature
winding connected solely to said resonant
circuit, a space discharge tube having a grid,
an anode, and a cathode, said tube having
the input circuit so connected to said resonant circuit as to have a potential impressed
on the grid which varies according to the
frequency of the generator current, a three
element amplifier tube having the output
circuit thereof connected to said regulating
field winding, and a resistance in the plate
circuit of the first tube for coupling the two
tubes.

8. In a regulator system for a motor having a regulating field winding, a pilot generator supplying current the frequency of
which varies according to the motor speed,
a resonant circuit connected to said generator
and tuned to a frequency slightly above the
frequency of the generator current when the
motor is operating at normal speed, a detector tube having the input circuit thereof connected across an element of said resonant
circuit, means for controlling the energization of said field winding according to the
current in the tube output circuit, and means
for supplying an alternating plate current of
lower frequency than the pilot generator
current to said tube from the armature of
said motor.

9. In a regulator system for a motor having a regulating field winding, a pilot generator supplying current the frequency of which varies according to the motor speed, a resonant circuit connected to said generator and tuned to a frequency slightly above the frequency of the generator current when the motor is operating at normal speed, a detector tube for controlling the energization of said regulating field winding, means for controlling the potential on the grid of said tube in accordance with the current flow in said resonant circuit and means for impressing an alternating current on the plate of said tube having a frequency less than the frequency of current from the pilot generator.

In witness whereof we hereunto subscribe our names this 14 day of July A. D., 1926.

HUGH M. STOLLER.
EDMUND R. MORTON.